United States Patent
Gocho et al.

(10) Patent No.: US 12,281,897 B2
(45) Date of Patent: Apr. 22, 2025

(54) RING LASER GYROSCOPE

(71) Applicant: JAPAN AVIATION ELECTRONICS INDUSTRY, LIMITED, Tokyo (JP)

(72) Inventors: Yusuke Gocho, Tokyo (JP); Naoki Yamamoto, Tokyo (JP); Kazunori Yoshioka, Tokyo (JP); Kenji Abe, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 200 days.

(21) Appl. No.: 18/091,148

(22) Filed: Dec. 29, 2022

(65) Prior Publication Data

US 2023/0251093 A1    Aug. 10, 2023

(30) Foreign Application Priority Data

Feb. 8, 2022    (JP) .................................. 2022-017814

(51) Int. Cl.
*G01C 19/66* (2006.01)
*G01C 19/00* (2013.01)
*G01C 19/70* (2006.01)

(52) U.S. Cl.
CPC ............. *G01C 19/70* (2013.01); *G01C 19/00* (2013.01); *G01C 19/662* (2013.01); *G01C 19/668* (2013.01)

(58) Field of Classification Search
CPC ...... G01C 19/70; G01C 19/00; G01C 19/662; G01C 19/668; G01C 19/68
See application file for complete search history.

(56) References Cited

U.S. PATENT DOCUMENTS

| | | | | | |
|---|---|---|---|---|---|
| 4,277,173 | A | * | 7/1981 | Ljung | G01C 19/70 356/476 |
| 4,597,667 | A | * | 7/1986 | Curby | G01C 19/68 356/476 |
| 4,653,918 | A | * | 3/1987 | Stjern | G01C 19/70 356/476 |
| 4,653,919 | A | * | 3/1987 | Stjern | G01C 19/70 356/469 |
| 5,359,413 | A | * | 10/1994 | Chang | G01C 19/68 356/469 |
| 6,683,692 | B2 | * | 1/2004 | McClary | G01C 19/56 356/475 |
| 2014/0300899 | A1 | | 10/2014 | Iizuka et al. | |

FOREIGN PATENT DOCUMENTS

| | | |
|---|---|---|
| BE | 899453 | 10/1984 |
| JP | 2013-024802 A | 2/2013 |
| JP | 2014-055801 A | 3/2014 |

OTHER PUBLICATIONS

Extended European Search Report Issued in Corresponding EP Patent Application No. 23150302.0, dated Jul. 31, 2023.

* cited by examiner

*Primary Examiner* — Jonathan M Hansen
(74) *Attorney, Agent, or Firm* — Greenblum & Bernstein, P.L.C.

(57) ABSTRACT

A ring laser gyroscope includes an optical block for generating laser beams that counter-propagate in a closed-loop type optical path, a dither mechanism for applying dither vibration for mitigating a lock-in phenomenon to the optical block, and a dither controller for controlling the dither vibration. The dither controller imparts randomness to the frequency of the angular velocity of the dither vibration.

8 Claims, 4 Drawing Sheets

RING LASER GYROSCOPE

TECHNICAL FIELD

The present disclosure relates to a ring laser gyroscope including a dither mechanism for mitigating a lock-in phenomenon, and more particularly to characteristics of vibrations produced by the dither mechanisms.

BACKGROUND ART

A ring laser gyroscope 900 known as related art will be generally described with reference to FIGS. 1 and 2. The ring laser gyroscope 900 includes an optical mechanism 910 and signal processor 920. The optical mechanism 910 includes an optical block 11 made of glass. A closed-loop type (usually polygonal, particularly triangular in an example shown in FIG. 1) optical path 12 is formed inside the optical block 11. Mirrors 13, 14, and 15 are arranged at respective apex portions of the optical path 12. The mirror 13 is a semi-transmissive mirror, and each of the mirrors 14 and 15 is a total reflection mirror. Anodes 16 and 17 and a cathode 18 are attached to the respective sides of the optical path 12. A laser medium is enclosed within the optical path 12. A high voltage is applied across the anodes 16, 17 and the cathode 18 to excite the laser medium. As a result, counter-propagating laser beams in the optical path 12 (in the example shown in FIG. 1, a clockwise laser beam and a counterclockwise laser beam) are generated. The clockwise laser beam is reflected by the mirrors 13, 14, and 15 in the optical path 12, and travels clockwise in a triangular looped shape. The counterclockwise laser beam is reflected by the mirrors 13, 14, and 15 in the optical path 12, and travels counterclockwise in a triangular looped shape. Hereinafter, the course of the laser beam within the optical path 12 will be referred to as a looped course.

When the optical block 11 rotates clockwise around the normal to a plane containing the looped course at a certain angular velocity (hereinafter referred to as input angular velocity), the frequency of the clockwise laser beam decreases in proportion to the magnitude of the input angular velocity due to the Sagnac effect, and the frequency of the counterclockwise laser beam increases in proportion to the magnitude of the input angular velocity due to the Sagnac effect. When the optical block 11 rotates counterclockwise, the frequency of the clockwise laser beam increases in proportion to the magnitude of the input angular velocity, and the frequency of the counterclockwise laser beam decreases in proportion to the magnitude of the input angular velocity. The frequency difference between the frequency of the clockwise laser beam and the frequency of the counter-clockwise laser beam corresponds to the number of moving optical interference fringes per unit time. Therefore, it is possible to detect the magnitude and polarity of the input angular velocity by measuring the frequency difference and the moving direction of the optical interference fringes.

To this end, laser beams are extracted through the mirror 13. In FIG. 1, reference numeral 22 denotes a prism for forming optical interference fringes between one laser beam and the other laser beam which are caused to travel in the same direction as each other by refracting the course of the one laser beam, and reference numeral 21 denotes a photo sensor 21 for detecting optical interference fringes (that is, interference light). Reference numeral 23 denotes a laser beam intensity measuring instrument for measuring the intensity of the extracted laser beam in order to control the length of the looped course. FIG. 1 omits an illustration of a course length controller for controlling the length of the looped course so that the intensity of the laser beam measured by the laser beam intensity measuring instrument 23 is kept constant.

In FIG. 1, the photosensor 21, the prism 22 and the laser beam intensity measuring instrument 23 are shown as components separate from the optical block 11, but the photosensor 21, the prism 22 and the laser beam intensity measuring instrument 23 are attached to the optical block 11 or a case to which the optical block 11 is secured.

The lock-in phenomenon is one of phenomena which are undesirable in the ring laser gyroscope from a practical point of view. The lock-in phenomenon is a phenomenon in which the frequency difference between the frequency of the clockwise laser beam and the frequency of the counterclockwise laser beam becomes zero although a non-zero input angular velocity is actually applied to the optical block 11, so that the angular velocity is detected as being equal to zero by the ring laser gyroscope. The lock-in phenomenon is derived from a synchronization phenomenon of counter-propagating laser beams, and it occurs when the optical block 11 rotates at a non-zero input angular velocity included in a small angular velocity range containing zero (hereinafter referred to as a lock-in angular velocity range). Since the counter-propagating laser beams are subject to disturbances from various components constituting the ring laser gyroscope, it is impossible to completely prevent occurrence of the lock-in phenomenon.

In order to mitigate the lock-in phenomenon (that is, to narrow the lock-in angular velocity range where the frequency difference between the laser beams is zero), a dither mechanism 200 which imparts, to the optical block 11, a circumferential vibration of the looped course, i.e. a vibration about the axis of the optical block 11 perpendicular to the plane containing the looped course is attached to an opening portion 19 located at the center of the optical block 11. This vibration is hereinafter referred to as dither vibration. For example, the angular frequency of the dither vibration is a fairly large value (usually several hundred radians per second) compared to the upper bound (or absolute lower bound) of the lock-in angular velocity range, and the angular amplitude of the dither vibration is less than 1 degree.

As shown in FIG. 2, the dither mechanism 200 includes a shaft portion 34 extending in one direction (that is, a direction perpendicular to the paper surface of FIG. 2), a cylindrical side wall portion 32, and two or more (three in this example) linking portions 33. The shaft portion 34 is located at the axial center of the side wall portion 32. The three linking portions 33 extend radially from the shaft portion 34 and reach the side wall portion 32. The three linking portions 33 partition the space between the shaft portion 34 and the side wall portion 32 at equal intervals. In this example, there exist three spaces surrounded by the shaft portion 34, the side wall portion 32, and the respective two adjacent linking portions 33, and three mounting portions 34a protrude from the shaft portion 34 into the respective three spaces. Each of the mounting portions 34a has a hole 34b for a screw that is used when the ring laser gyroscope 900 having the dither mechanism 200 is mounted and fixed, for example, onto the case by screwing. A piezoelectric element 35 is attached to each of both side surfaces of each linking portion 33. The side wall portion 32 is in contact with the optical block 11.

Two pairs of total three pairs of (that is, six) piezoelectric elements 35, the three pairs being attached to the three linking portions 33, are used to generate dither vibration, and the remaining one pair is used to detect dither vibration.

The dither mechanism 200 is a vibration generating mechanism, and typically has a frequency unique to the dither mechanism 200. In order to drive the dither mechanism 200 efficiently, it is desirable that the frequency of the dither vibration is approximately equal to the natural frequency of the dither mechanism 200. According to the related art, in order to mitigate the lock-in phenomenon, a dither controller 43 included in a signal processor 920 uses an electrical signal (hereinafter referred to as a dither pickoff signal) obtained by the piezoelectric elements used to detect dither vibration to control the dither vibration so that the dither vibration has a frequency which is approximately equal to the natural frequency of the dither mechanism 200 (see FIG. 3 of Japanese Patent Application Laid Open No. 2013-024802). The piezoelectric elements used to generate dither vibration generate dither vibration controlled by the dither controller 43. The dither pickoff signal is also input to a bias signal eliminator 42 included in the signal processor 920.

Information on optical interference fringes (for example, moving direction and velocity of the optical interference fringes) detected by the photosensor 21 is input to a detection processor 41 included in the signal processor 920, and converted into angular velocity information. The angular velocity information output by the detection processor 41 is input to the bias signal eliminator 42.

The bias signal eliminator 42 eliminates a vibration angular velocity component corresponding to the dither vibration from the angular velocity information by using the dither pickoff signal, and outputs this result as an angular velocity signal. This angular velocity signal represents the angular velocity of the motion of an instrument including the ring laser gyroscope 900.

Such ring laser gyroscopes are disclosed as related art, for example, in Japanese Patent Application Laid Open No. 2014-055801, Japanese Patent Application Laid Open No. 2013-024802, and U.S. Pat. No. 6,683,692.

As described above, it is impossible to completely prevent occurrence of the lock-in phenomenon even if dither vibration is applied to the optical block. This is because there is a period of time during which the angular velocity of the optical block falls within the lock-in angular velocity range each time the direction of dither vibration changes. At this time, the lock-in phenomenon occurs. Therefore, for example, due to aged deterioration or environmental temperature of the ring laser gyroscope, the sampling for digital processing of the signal processor may be synchronized with the occurrence of the lock-in phenomenon, and this synchronization may cause deterioration in accuracy of the detected angular velocity to be accumulated. According to the related art, randomness is imparted to the amplitude of the angular velocity of the dither vibration (that is, random noise is added to the amplitude) in order to reduce the accumulation of such degradation in accuracy.

However, even when randomness is imparted to the amplitude of the angular velocity of the dither vibration, it cannot be sufficiently suppressed that the sampling for the digital processing of the signal processor is synchronized with the occurrence of the lock-in phenomenon because the frequency of the angular velocity of the dither vibration is constant.

BRIEF SUMMARY OF THE INVENTION

In view of such background art, from another point of view, a ring laser gyroscope is provided which can reduce the accumulation of deterioration in accuracy of the detected angular velocity caused by the lock-in phenomenon that cannot be prevented even by dither vibration.

Technical matters described in this section are neither intended to explicitly or implicitly limit inventions recited in the claims, nor intended to allow any person other than persons benefiting from the present inventions (for example, applicants and proprietors) to limit or construe in a limited sense the inventions recited in the claims, and are merely provided to facilitate understanding of the gist of the present invention. A general outline of the invention from other aspects can be appreciated, for example, from the claims as originally filed in the present patent application.

According to the present invention, randomness is imparted to the frequency of the angular velocity of the dither vibration. In other words, random noise is added to the frequency of the angular velocity of the dither vibration.

These and other objects, features and advantages of the present invention will become apparent from the detailed description taken in conjunction with the accompanying drawings.

Effects of the Invention

According to the present invention, it is possible to reduce accumulation of deterioration in accuracy of a detected angular velocity caused by a lock-in phenomenon that cannot be prevented even by dither vibration.

BRIEF DESCRIPTION OF THE DRAWINGS

The subject matter, which is regarded as the invention, is particularly pointed out and distinctly claimed in the claims at the conclusion of the specification. The present invention itself, and manner in which it may be made or used, if any, may be better understood after a review of the following description in connection with the accompanying drawings in which:

LIST OF REFERENCE NUMERALS

Figure 1:
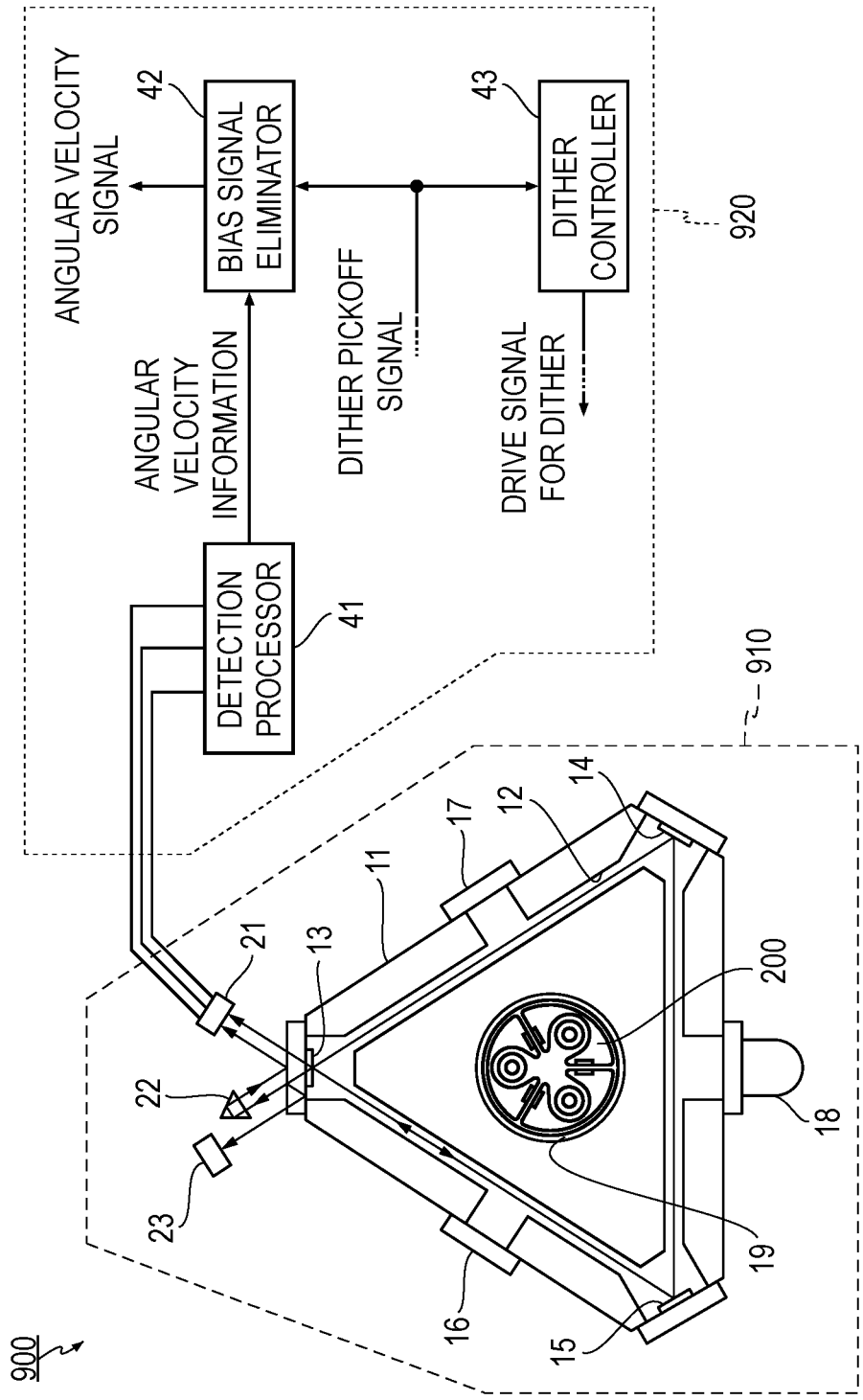
FIG. 1 shows a configuration of a ring laser gyroscope of related art.
Figure 2:
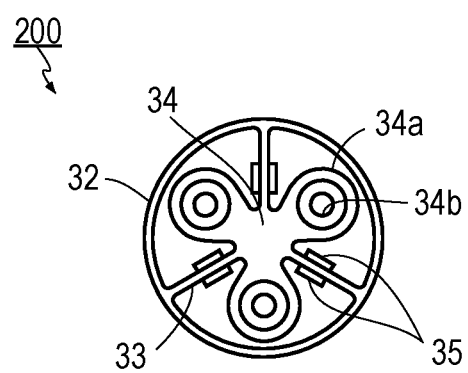
FIG. 2 shows a configuration of a dither mechanism.

With regard to reference numerals used, the following numbering is used throughout the drawings.

11: optical block
12: optical path
13: mirror
14: mirror
16: anode
18: cathode
19: opening portion
21: photosensor
22: prism
23: laser beam intensity measuring instrument
32: side wall portion
33: linking portion
34: shaft portion
34a: mounting portion
34b: hole
35: piezoelectric element
41: detection processor 42: bias signal eliminator
43: dither controller
100: ring laser gyroscope
200: dither mechanism
300: dither controller
302: A/D converter
304: amplitude control circuit
306: first random noise generator
308: phase shifter
310: second random noise generator
312: multiplier
314: D/A converter
316: amplification circuit
800: Feedback system
810: vibration system
820: sensor
830: primary phase shifter
900: ring laser gyroscope
910: optical mechanism
920: signal processor

DETAILED DESCRIPTION

Before describing an embodiment, a theoretical outline of the present invention will be described.

The lock-in phenomenon of a ring laser gyroscope originates from a synchronization phenomenon of counter-propagating laser beams. The time change rate of the phase difference $\phi(t)$ between the counter-propagating laser beams is represented by Equation (1) as Adler Equation. Here, t represents the time, $\Omega$ represents an input angular velocity, and $\Omega_L$ represents an upper limit value (or the absolute value of a lower limit value) of the lock-in angular velocity range.

$$\frac{d\phi(t)}{dt} = \Omega - \Omega_L \sin(\phi(t)) \tag{1}$$

Adding, to Equation (1), for example, a sine wave representing the angular velocity of the dither vibration for mitigating the lock-in phenomenon yields Equation (2). Here, $\Omega_d$ represents the amplitude of the angular velocity of dither vibration, and $\omega_d$ represents the angular frequency of the angular velocity of dither vibration. The angular velocity of dither vibration is not limited to a sine wave, and it may be represented by a triangular wave, for example.

$$\frac{d\phi(t)}{dt} = \Omega + \Omega_d \sin(\omega_d t) - \Omega_L \sin(\phi(t)) \tag{2}$$

When $\omega_d$ is sufficiently large (typically several hundreds of radians per second), Equation (2) is approximately rewritten into Equation (3). Here, $J_0(x)$ represents the 0-th order Bessel function of the first kind, and $\phi_0$ represents an initial phase.

$$\frac{d\phi(t)}{dt} = \Omega + \Omega_d \sin(\omega_d t) - J_0(\Omega_d/\omega_d)\Omega_L \sin(\Omega t + \phi_0) \tag{3}$$

According to the related art, random noise is added to the amplitude of the angular velocity of dither vibration in order to reduce the accumulation of degradation in accuracy of a detected angular velocity caused by the lock-in phenomenon that cannot be prevented even by the dither vibration. This implies Equation (4). Here, $\xi(t)$ represents random noise. In this specification, the term "random" or "randomness" is used to mean having non-regularity or having non-periodicity, and it does not necessarily require having non-settlement or having non-reproducibility.

$$\frac{d\phi(t)}{dt} = \Omega + (\Omega_d + \xi(t))\sin(\omega_d t) - J_0(\Omega_d/\omega_d)\Omega_L \sin(\Omega t + \phi_0) \tag{4}$$

According to the related art, even when random noise is added to the amplitude of the angular velocity of dither vibration, it cannot be sufficiently suppressed that the sampling for the digital processing of the signal processor is synchronized with occurrence of the lock-in phenomenon because $\omega_d$ is constant. Therefore, in the present invention, random noise is added to the frequency of the angular velocity of dither vibration in order to reduce the accumulation of deterioration in accuracy of the detected angular velocity caused by the lock-in phenomenon that cannot be prevented even by the dither vibration. This implies Equation (5).

$$\frac{d\phi(t)}{dt} = \Omega + \Omega_d \sin((\omega_d + \xi(t))t) - J_0(\Omega_d/\omega_d)\Omega_L \sin(\Omega t + \phi_0) \tag{5}$$

An example of a mechanism for applying random noise to $\omega_d$ will be described below. Here, for the sake of simplicity, the description based on an analog circuit will be made, but the mechanism for applying random noise to $\omega_d$ may be constructed by a digital circuit. A motion equation of rotational motion of an optical block caused by a dither mechanism for applying a sinusoidal torque $u=M \sin(\omega_d t)$ to the optical block is expressed by Equation (6). Here, $\theta_d$ represents a displacement angle of the optical block caused by dither vibration, J represents the moment of inertia of the optical block, C represents a viscous damping coefficient, K represents a spring constant, and M represents the amplitude of the sinusoidal torque. $\theta_d$ is a function of time t.

$$J\frac{d^2\theta_d}{dt^2} + C\frac{d\theta_d}{dt} + K\theta_d = M\sin\omega_d t \tag{6}$$

Since the solution of a homogeneous equation when the right hand side of Equation (6) is equal to 0, that is, the solution of the damped free vibration decays with time, only a steady vibration which is a particular solution for a sinusoidal torque remains after a sufficient time has elapsed. Therefore, only the steady vibration will be investigated. Assuming that the particular solution is given by Equation (7), the relationship between the angular amplitude O and the phase angle $\phi$ will be determined.

$$\theta_d = \theta \sin(\omega_d t - \phi) \tag{7}$$

Substituting Equation (7) into Equation (6) yields Equations (8) and (9). Here, $\eta = \omega_d/\omega_n$ represents a frequency ratio, $\zeta = C/C_C$ represents a damping ratio, $\omega_n = \sqrt{(K/J)}$ represents an undamped natural angular frequency, $C_C = 2\sqrt{(JK)} = 2J\omega_n$ represents a critical damping coefficient, and $\Theta_0 = M/K$.

$$\Theta = \frac{\Theta_0}{\sqrt{(1-\eta^2)^2 + 4\zeta^2\eta^2}} \tag{8}$$

$$\tan\phi = \frac{2\zeta\eta}{1-\eta^2} \quad (9)$$

When a vibration system including the optical block and the dither mechanism resonates, the frequency ratio $\eta_r$ that gives the maximum response magnification is called a resonance point, and given by Equation (10). The phase angle at the resonance point is given by Equation (11). Note that, since the viscous damping coefficient C of the actual optical block is sufficiently small, $\phi_r$ is approximately 90 degrees.

$$\eta_r = \sqrt{1-2\zeta^2} \quad (10)$$

$$\phi_r = \tan^{-1}\left(\frac{\sqrt{1-2\zeta^2}}{\zeta}\right) \quad (11)$$

Figure 3:
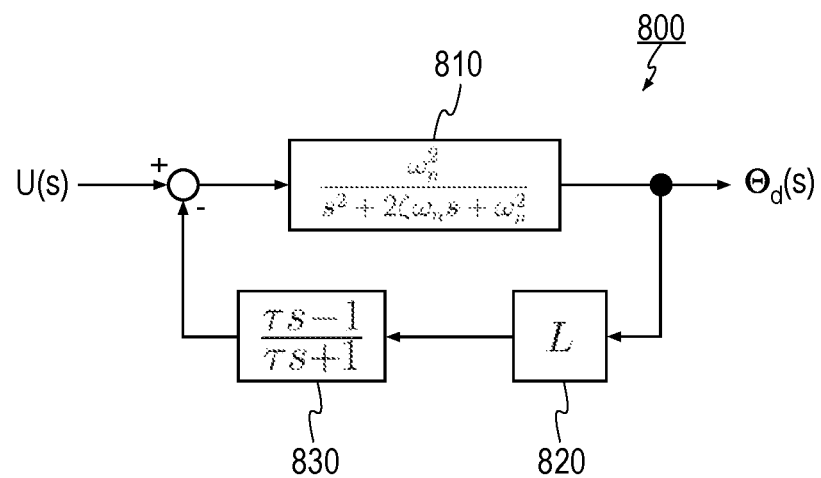
FIG. 3 is a block diagram of a feedback system.

As described above, by applying a sinusoidal torque u to the optical block at an angular frequency of $\omega_d = \eta_r \omega_n$, the vibration system resonates and the displacement angle $\theta_d$ with a phase delay corresponding $\phi_r$ in Equation (11) is detected. Therefore, when conceiving a feedback system 800 for performing feedback control of the sinusoidal torque u on the basis of the displacement angle $\theta_d$, the feedback system 800 can include the vibration system 810 described above, a sensor 820 for detecting the displacement angle $\theta_d$, and a primary phase shifter 830, and the optical block is given the sinusoidal torque u generated by driving the dither mechanism with a signal that the primary phase shifter 830 obtains by advancing, by only $\phi_r$, the phase of a signal representing the displacement angle $\theta_d$ detected by the sensor 820, thereby indeed achieving a vibration system that can keep on vibrating at a resonance frequency. A block diagram of this feedback system 800 is shown in FIG. 3.

A transfer function of the vibration system 810, that is, a transfer function of Equation (6) is given by Equation (12). Since the numerator of Equation (12) is merely a gain, the following description will consider Equation (13) which is a transfer function of a general second-order delay system.

$$G(s) = \frac{1/J}{s^2 + 2\zeta\omega_n s + \omega_n^2} \quad (12)$$

$$G(s) = \frac{\omega_n^2}{s^2 + 2\zeta\omega_n s + \omega_n^2} \quad (13)$$

Figure 4:
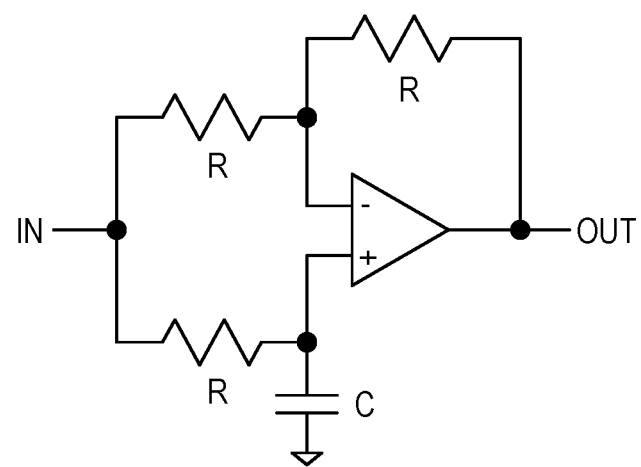
FIG. 4 shows an example of a primary phase shifter.

A closed-loop transfer function $W_c$ of the feedback system 800 shown in FIG. 3 is expressed by Equation (14). L represents the gain of the sensor 820. Here, $\tau$ represents the time constant of the primary phase shifter 830, and particularly $\tau$=CR when the primary phase shifter 830 has a configuration shown in FIG. 4 as an example.

$$W_c = \frac{\frac{\omega_n^2}{s^2 + 2\zeta\omega_n s + \omega_n^2}}{1 + \frac{\omega_n^2}{s^2 + 2\zeta\omega_n s + \omega_n^2} \cdot L \cdot \frac{\tau s - 1}{\tau s + 1}} \quad (14)$$

The second term of the denominator of $W_c$ is an open-loop transfer function $W_0$, and it is known that the feedback system exhibits a resonance characteristic in a band where the gain $|W_0|$ (see Equation (15)) of the open-loop transfer function $W_0$ is approximately equal to 1.

$$|W_0| = \left|\frac{\omega_n^2}{s^2 + 2\zeta\omega_n s + \omega_n^2} \cdot L \cdot \frac{\tau s - 1}{\tau s + 1}\right| \quad (15)$$

$W_c$ is developed into Equation (16).

$$W_c = \frac{\omega_n^2 s + \frac{\omega_n^2}{\tau}}{s^3 + \frac{1+2\zeta\tau\omega_n}{\tau}s^2 + \frac{\tau\omega_n^2 + L\tau\omega_n^2 + 2\zeta\omega_n}{\tau}s + \frac{\omega_n^2 - L\omega_n^2}{\tau}} \quad (16)$$

It is assumed that $W_c$ can be represented with Equation (17) by decomposing Equation (16) into partial fractions.

$$W_c = \frac{as + b\omega_d}{s^2 + \omega_d^2} - \frac{c}{s+\alpha} \quad (17)$$

The vibration system is designed such that the vibration is magnified or sustained, that is, the system is unstable or reaches a stability limit. Therefore, when sustained vibration is obtained at the stability limit, then c=a. Therefore, by comparing Equation (16) with Equation (17), Equations (18) to (23) are yielded. However, $\omega_d > 0$, L<0, $\tau$>0.

$$a = \frac{2\zeta\tau^2\omega_n^3}{4\zeta^2\tau^2\omega_n^2 + \tau^2\omega_d^2 + 4\zeta\tau\omega_n + 1} \quad (18)$$

$$b = \frac{\omega_n^2(\tau^2\omega_d^2 + 2\zeta\tau\omega_n + 1)}{\omega_d(4\zeta^2\tau^2\omega_n^2 + \tau^2\omega_d^2 + 4\zeta\tau\omega_n + 1)} \quad (19)$$

$$\alpha = \frac{2\zeta\tau\omega_n + 1}{\tau} \quad (20)$$

$$\omega_d = \sqrt{\frac{\omega_n(\tau\omega_n + \zeta)}{\tau(\zeta\tau\omega_n + 1)}} \quad (21)$$

$$L = -\frac{-\tau\omega_d^2 + \tau\omega_n^2 + 2\zeta\omega_n}{\tau\omega_n^2} \quad (22)$$

$$\tau = \frac{\omega_n^2 - \omega_d^2 - L\omega_n^2}{2\zeta\omega_d^2\omega_n} \quad (23)$$

Equations (22) and (23) yield Equation (24). As is well known, the gain of the primary phase shifter 830 is equal to 1 regardless of the frequency. Further, as is well known, the gain of the transfer function of the second-order delay system is given by Equation (25). Therefore, when the frequency of the second-order delay system is equal to $\omega_d$ ($\omega = \omega_d$), the gain $|W_0|$ of the open-loop transfer function $W_0$ is equal to 1 and the feedback system 800 exhibits the resonance characteristic.

$$L = -\sqrt{(1-\eta^2)^2 + 4\zeta^2\eta^2} \quad (24)$$

$$|G(j\omega)| = \frac{1}{\sqrt{\left(1-\left(\frac{\omega}{\omega_n}\right)^2\right)^2 + 4\zeta^2\left(\frac{\omega}{\omega_n}\right)^2}} \quad (25)$$

Furthermore, Equations (24) and (8) yield Equation (26). Therefore, by performing control for keeping the angular amplitude of the optical block constant, L and $\omega_d$ are settled to constant values. At this time, by randomly changing ti at a speed which is sufficiently lower than a response speed of the control, it is possible to randomly change $\omega_d$ near the resonance point. In other words, random noise can be given to $\omega_d$ by randomly changing the amount of phase shift by the phase shifter.

$$L = -\frac{\Theta_0}{\Theta} \quad (26)$$

From the viewpoint of efficient driving of the dither mechanism, it is preferable that the upper limit of the phase shift amount does not exceed, for example, 1% of the natural frequency $\omega_d$ of the dither mechanism. In other words, it is preferable that the fluctuation range of the frequency to which randomness has been imparted does not exceed 2% of the natural frequency of the dither mechanism. The lower limit of the phase shift amount can be determined according to, for example, the degree of change in the natural frequency of the dither mechanism caused by change in environmental temperature or aged deterioration, and is, for example, a shift amount that causes a change of 0.25 Hz in the natural frequency $\omega_d$ of the dither mechanism.

Figure 5:
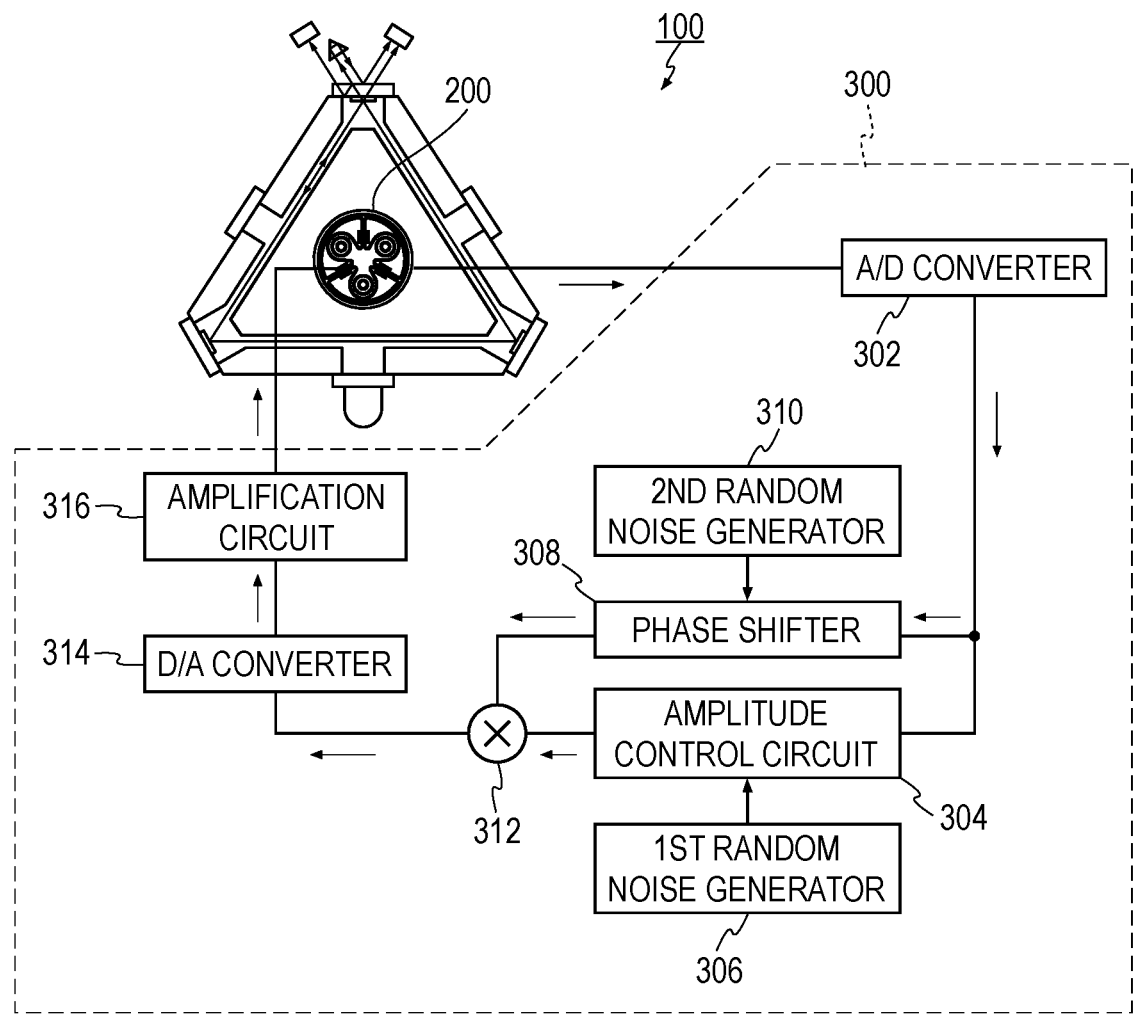
FIG. 5 shows a configuration of a ring laser gyroscope of an embodiment.

A ring laser gyroscope 100 according to an embodiment will be described with reference to FIG. 5. The ring laser gyroscope 100 has the same configuration as the ring laser gyroscope 900 except that it includes a dither controller 300 instead of the dither controller 43 of the ring laser gyroscope 900. Therefore, duplicative description of the same components is omitted by stating here that the description of the ring laser gyroscope 900 except for the dither controller 43 is incorporated. In FIG. 5, illustration of components other than the dither controller 43 included in the signal processor 920 is omitted.

The dither controller 300 includes an analog-to-digital (A/D) converter 302, an amplitude control circuit 304, a first random noise generator 306, a phase shifter 308, and a second random noise generator 310, a multiplier 312, a digital-to-analog (D/A) converter 314, and an amplification circuit 316.

The A/D converter 302 converts a dither pickoff signal to a digital signal. The amplitude control circuit 304 compares a reference amplitude with an amplitude of the digital dither pick-off signal obtained, for example, by passing the digital dither pick-off signal through a low-pass filter and a square root operator, and performs proportional-integral-differential control (PID control) on the amplitude of the digital dither pickoff signal so that the amplitude thereof is constant. As a method of imparting randomness to the amplitude of the digital dither pickoff signal may be adopted, for example, a method of changing the reference amplitude on the basis of a pseudo-random value generated by the first random noise generator 306, or a method of adding an amplitude based on a pseudo-random value generated by the first random noise generator 306 to the amplitude of the digital pickoff signal obtained by the PID control.

The phase shifter 308 is, for example, a voltage-controlled digital phase shifter, and controls the phase of the digital dither pickoff signal such that stable self-vibration occurs as described above. As a method of imparting randomness to the phase of the digital dither pickoff signal may be adopted, for example, a method of changing the phase amount on the basis of a pseudo-random value generated by the second random noise generator 310.

The multiplier 312 multiplies the output of the amplitude control circuit 304 and the output of phase shifter 308. The D/A converter 314 converts the output of the multiplier 312 into an analog signal. The amplification circuit 316 performs power amplification on the output of the D/A converter 314. The power-amplified output of the D/A converter 314 is supplied to a piezoelectric element for generating dither vibration. Note that a pulse width modulation (PWM) converter may be used instead of the D/A converter 314.

The input of the A/D converter 302 is not limited to the dither pickoff signal, and may be, for example, a signal obtained by passing a signal representing the phase difference $\phi(t)$ between laser beams through a high-pass filter.

A configuration in which the dither controller 300 does not include the first random noise generator 306 is also allowed, without being limited to the above-described embodiment.

Random noise may be applied to the frequency of the angular velocity of dither vibration all the time, but only when the intensity of the output signal of the amplitude control circuit 304 falls below a predetermined threshold value, random noise may be applied to the frequency of the angular velocity of dither vibration. Random noise may be applied to the amplitude of the angular velocity of dither vibration all the time, but only when the intensity of the output signal of the amplitude control circuit 304 falls below a predetermined threshold value, random noise may be applied to the amplitude of the angular velocity of dither vibration.

The second random noise generator 310 may generate pseudo-random numeral values at regular time intervals, or may generate pseudo-random numeral values at random time intervals.

Whether randomness is imparted to the frequency of the angular velocity of dither vibration can be easily found, for example, by performing fast Fourier transform (FFT) analysis on the sound of dither vibration.

<Addendum>

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

Moreover, the use of the terms "first", "second", "i-th", etc., if any, do not denote any order or importance, but rather the terms "first", "second", "i-th", etc. are used to distinguish one element from another. The term "first" does not necessarily mean "coming before all others in order". The terminology used herein is for the purpose of describing particular embodiments only and is not intended to limit the invention in any way. As used herein, the singular forms "a", "an" and "the" are intended to include the plural forms as well, unless the context clearly indicates otherwise. It will be further understood that the terms "comprise", "comprises", and/or "comprising," when used in this specification and/or the appended claims, specify the presence of stated features, steps, operations, elements, and/or components, but do not preclude the presence or addition of one or more other features, steps, operations, elements, components, and/or groups thereof. The same goes for "include", "includes", and/or "including". The term "and/or", if any, includes any and all combinations of one or more of the associated listed items. In the claims and the specification, unless otherwise noted, "connect", "join", "couple", "interlock", or synonyms therefor and all the word forms thereof, if any, do not necessarily deny the presence of one or more intermediate elements between two elements, for instance, two elements "connected" or "joined" to each other or "interlocked" with each other. Connection between elements, if required, may be physical connection, electrical connection, or a combination thereof. In the claims and the specification, the term "any", if any, is to be understood as a term synonymous with a universal quantification ∀ unless otherwise specified. For example, the expression "for any X" has the same meaning as "for all X" or "for each X".

Unless otherwise defined, all terms (including technical and scientific terms) used herein have the same meaning as commonly understood by those skilled in the art to which the invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual techniques or steps in an unnecessary fashion. Nevertheless, the specification and claims should be read with the understanding that such combinations are entirely within the scope of the invention and the claims.

The corresponding structures, materials, acts, and equivalents of all means or step plus function elements in the claims below, if any, are intended to include any structure, material, or act for performing the function in combination with other claimed elements as specifically claimed.

The foregoing description of the embodiments of the invention has been presented for the purpose of illustration and description. It is not intended to be exhaustive and to limit the invention to the precise form disclosed. Modifications or variations are possible in light of the above teaching. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A ring laser gyroscope comprising:
   an optical block including a closed loop optical path and configured to generate laser beams counter-propagating in the closed loop optical path;
   a dither mechanism configured to apply dither vibration for mitigating a lock-in phenomenon to the optical block;
   a sensor to detect a displacement angle of the optical block; and
   a dither controller comprising: a phase shifter; and a random noise generator to generate a random noise, and configured to drive the dither mechanism by a signal that is obtainable by the phase shifter shifting a phase of a signal representing the displacement angle of the optical block by a time-varying amount of phase shift obtainable by fluctuating depending on the random noise a constant amount of phase shift necessary for making the dither mechanism vibrate at a natural frequency of the dither mechanism, thereby making the dither vibration nonconstant in frequency of angular velocity of the dither vibration by having randomness.

2. The ring laser gyroscope according to claim 1, wherein a fluctuation range of the frequency of the angular velocity of the dither vibration does not exceed 2 percent of the natural frequency of the dither mechanism.

3. The ring laser gyroscope according to claim 1, wherein the random noise generator generates the random noise at regular or random time intervals, and
   while the random noise generator does not generate the random noise, the dither controller drives the dither mechanism by a signal that is obtainable by the phase shifter shifting the phase of the signal representing the displacement angle of the optical block by the constant amount of phase shift necessary for making the dither mechanism vibrate at the natural frequency of the dither mechanism.

4. The ring laser gyroscope according to claim 2, wherein the random noise generator generates the random noise at regular or random time intervals, and
   while the random noise generator does not generate the random noise, the dither controller drives the dither mechanism by a signal that is obtainable by the phase shifter shifting the phase of the signal representing the displacement angle of the optical block by the constant amount of phase shift necessary for making the dither mechanism vibrate at the natural frequency of the dither mechanism.

5. The ring laser gyroscope according to claim 1, wherein the dither controller is configured further to impart randomness to an amplitude of the angular velocity of the dither vibration.

6. The ring laser gyroscope according to claim 2, wherein the dither controller is configured further to impart randomness to an amplitude of the angular velocity of the dither vibration.

7. The ring laser gyroscope according to claim 3, wherein the dither controller is configured further to impart randomness to an amplitude of the angular velocity of the dither vibration.

8. The ring laser gyroscope according to claim 4, wherein the dither controller is configured further to impart randomness to an amplitude of the angular velocity of the dither vibration.

* * * * *